United States Patent [19]

Alexandrovich et al.

[11] Patent Number: 4,509,159
[45] Date of Patent: Apr. 2, 1985

[54] ALUMINUM-ALUMINUM OXIDE STYLUS ARM

[75] Inventors: George Alexandrovich, Commack; J. Raymond Edinger, Uniondale; Alan Hofer, Wantaugh; John Kuykendall, Nesconset, all of N.Y.

[73] Assignee: Pickering & Company, Inc., Plainview, N.Y.

[21] Appl. No.: 447,128

[22] Filed: Dec. 6, 1982

[51] Int. Cl.³ .................... G11B 3/02; H04R 11/12
[52] U.S. Cl. .................................. 369/170; 29/169.5; 204/25; 204/58
[58] Field of Search ............... 369/170, 173; 204/58, 204/25; 29/169.5

[56] References Cited

U.S. PATENT DOCUMENTS

| | | | |
|---|---|---|---|
| 3,918,723 | 11/1975 | Nakajima et al. | 369/170 |
| 3,926,441 | 12/1975 | Hibi et al. | 369/170 |
| 3,983,335 | 9/1976 | Nemoto | 369/170 |
| 4,128,461 | 12/1978 | Leinet et al. | 204/58 |
| 4,397,013 | 8/1983 | Shiomi et al. | 369/170 |
| 4,433,408 | 2/1984 | Azuma et al. | 369/170 |

*Primary Examiner*—Steven L. Stephan
*Attorney, Agent, or Firm*—Kane, Dalsimer, Kane, Sullivan & Kurucz

[57] ABSTRACT

An improved stylus assembly for a phonograph cartridge is provided. The assembly includes an arm having a jeweled stylus attached to one end thereof. The arm is formed of a hollow aluminum tube which has been anodized so as to form an aluminum oxide skin about the outer surface thereof. The skin extends for no more than one-half the thickness of the arm.

4 Claims, 2 Drawing Figures

ALUMINUM-ALUMINUM OXIDE STYLUS ARM

BACKGROUND OF THE INVENTION

The present invention relates to phonograph cartridges and in particular to an improved stylus arm for such cartridges and a method for manufacturing the same.

In the typical phonograph cartridge a record engaging stylus is used to trace the undulations of a record's grooves and to transmit the same to a magnetic or electro-magnetic circuit so as to cause changes in the circuit and hence produce an output electrical signal which, after suitable amplification, reproduces the recorded information. The stylus is commonly mounted to one end of an arm upon which a permanent magnet or magnetic member is also mounted for movement within a magnetic circuit. As the stylus moves the movement is transmitted through the arm to the magnetic element which results in some change in the flux pattern of the magnetic circuit and hence the desired output signal being induced.

It can thus be seen that the arm which forms the connection between the stylus and magnetic element is critical to insure that the information recorded is properly played back. While it would appear that a stiff arm is desirable to insure that movement of the stylus is accurately transmitted to the magnetic element, an overly stiff arm could resonate at frequencies within the cartridge operating range. Such resonance could cause the stylus to cut into the walls of the record groove thereby damaging the record. On the other hand, if the arm is not sufficiently stiff, the movement of the stylus would not be accurately transmitted to the magnetic element.

The critical parameter in the design of stylus arms has been found to be the stiffness/weight ratio. The lower the ratio the more likely the tube is to resonate and hence cause possible record damage. For this reason, it has been customary for the stylus arm to be in the form of a hollow tube to maximize stiffness for a given weight. Aluminum is the preferred material for the arm tube because of the relative ease with which it can be worked into a desired shaped.

With the above in mind, it is the principal object of the present invention to provide an improved stylus arm wherein the stiffness/weight ratio may be controlled as required.

A further object is to provide such an arm which may be formed and worked utilizing conventional equipment.

A still further object is to provide such an arm wherein the stiffness may be increased without any appreciable change in the weight of the arm for a given size, material and shape.

Still other objects and advantages will be apparent from the following description of the invention.

SUMMARY OF THE INVENTION

The above and other objects and advantages are attained in accordance with the present invention by providing a stylus arm in the form of a metallic tube. The tube is anodized from the outside in whereby to convert the outer surface of the tube into an oxide of the metal. The result is that the stiffness of the arm is increased substantially by the oxide skin with no substantial change in the weight of the arm. Further, by anodizing the tube after the tube has been shaped and the stylus jewel has been set in place, the difficulties of working with the metallic oxide (as distinct from working with the metal) are avoided. In addition, the oxide skin serves as a protective layer for the arm and serves as a convenient vehicle for adding coloring to the arm. In the preferred embodiment, the tube was formed of aluminum and anodized to approximately one-half its thickness.

DETAILED DESCRIPTION OF THE PREFERRED EMBODIMENT

Figure 1:
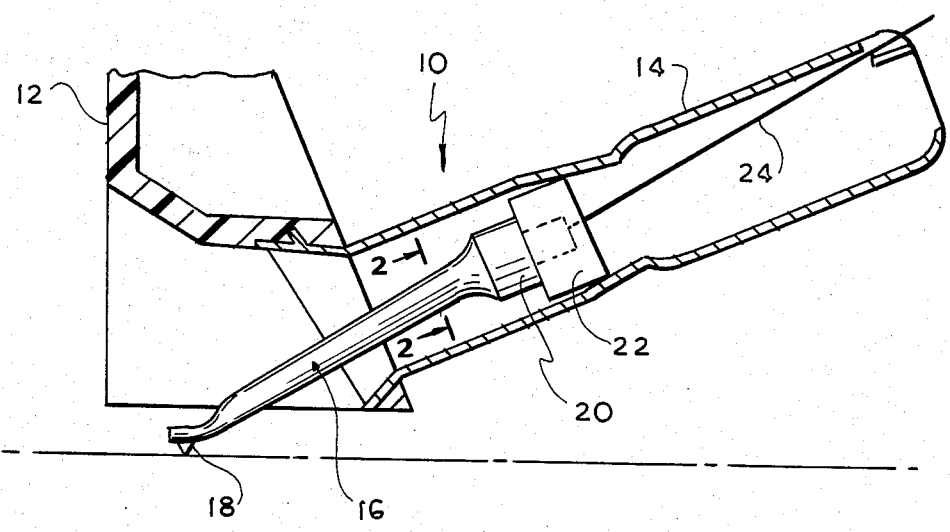
FIG. 1 is a side elevational view, partly in section, of the stylus assembly of the present invention; and, FIG. 2 is a sectional view through the stylus arm taken along lines 2—2 of FIG. 1.
Figure 2:
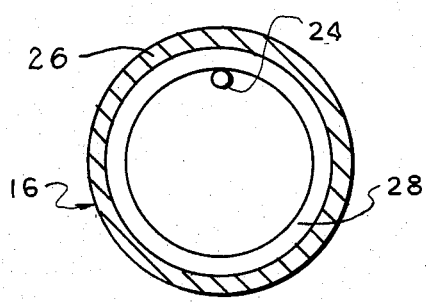

Reference is now made to the drawings wherein a phonograph cartridge stylus assembly 10 is depicted. The stylus assembly may, for example, be of the type depicted in U.S. Pat. No. 3,964,751 which is commonly assigned with the present application to Pickering & Company, Inc. of Plainview, N.Y. It should be understood, however, that the present invention need not be limited to any particular stylus assembly construction or design.

The stylus assembly 10 comprises a housing 12 which is formed of plastic and shaped to interengage with the cartridge body for which the stylus assembly is designed. A tube 14 of an electrically conducting non-magnetic material such as aluminum is affixed to the housing and extends rearwardly from the housing.

A stylus arm 16 is positioned within tube 14 and extends from the forward end of tube 14 out of housing 12. A jeweled stylus 18 is mounted to the forward end of arm 16 and hence extends outside the stylus housing to permit its engagement with a record's grooves. A magnetic element 20 is mounted toward the end of arm 16. The magnetic element may be a permanent magnetic as disclosed in the above referenced patent for use in a "moving magnet" type of cartridge or element 20 may comprise a permeable member or coil for use in a "moving iron" or "moving coil" type of cartridge. Similarly, the magnetic element may be mounted to the arm at any point along the arm opposite to the jeweled tip. The arm 16 is secured to tube 14 through a rubber grommet 22 which acts as a universal joint as well as a damper. A tie wire 24 connects the rear of arm 16 to the tube 14.

In accordance with the present invention, arm 16 is formed of aluminum. The arm, after it is formed and the stylus jewel attached is anodized from the outside in to a depth of approximately one-half the tube thickness thereby forming an aluminum-oxide skin 26 about an interior aluminum core 28. It should be noted that the tie wire 24 is secured to the inner surface 28 of arm 16 as well as to the aluminum tube 14. It should be noted that the inner surface is aluminum, not aluminum oxide. As a result, by forming the tie wire 24 of an electrically conductive material such as copper or aluminum an electrical connection is formed and by grounding the tube 14, the arm will also be grounded. Grounding eliminates any static build-up which otherwise would occur on the arm as the stylus tracks across a vinyl record. The static build-up would cause dust particles and vinyl debris to cling to the arm and thereby interfere with the cartridge's operation.

As pointed out above, the anodizing of arm 16 takes place after the arm has been fully formed and shaped. In this regard, after the arm is formed and shaped, a diamond jewel is attached to the arm and the arm ends are sealed such as with a lacquer, wax or oil. The arm is then positioned within an anodizing bath and anodized. After anodizing the seals are opened and the assembly of the stylus is completed. Anodizing may be accomplished in a standard anodizing bath comprising sulphuric and oxalic acids in a ratio of 5:1 and an anodizing current density of 2 amperes per square inch.

By controlling the anodizing time the thickness of the aluminum oxide layer may be controlled and hence the stiffness/weight ratio of the arm may be controlled. This permits arms of differing dampening characteristic to be produced as may be required.

Thus, in accordance with the above, the aforementioned objects are attained.

Having thus described the invention, what is claimed is:

1. A phonographic stylus assembly comprising: a hollow arm formed of a non-magnetic metallic material; a jeweled stylus affixed to one end of said arm and a magnetic element mounted to said arm opposite said jeweled stylus; said arm having an anodized skin extending inwardly for substantially one-half the thickness of said arm from the outer surface toward the interior surface thereof, said skin comprising an oxide of said metallic material; a non-magnetic, electrically conducting tube surrounding said arm; and an electrically conducting tie wire electrically connecting the interior surface of said arm with said tube.

2. The stylus assembly in accordance with claim 1 wherein said metallic material comprises aluminum.

3. The method of forming a phonograph cartridge stylus assembly comprising the steps of:
   forming a stylus arm of a hollow non-magnetic metallic material;
   securing a jeweled stylus to one end of said arm;
   anodizing said arm in an anodizing bath so as to form a skin of an oxide of said metallic arm about the outer surface of said arm; and,
   mounting said arm within a non-magnetic electrically conductive tube and securing an electrically conductive tie wire between the interior of said arm and said conductive tube.

4. The method in accordance with claim 3 wherein said arm is formed of a hollow tube and comprising the further step of sealing the ends of said arm prior to anodizing said arm whereby said oxide skin is formed on the exterior of said arm only.

* * * * *